(12) United States Patent
Odaka et al.

(10) Patent No.: US 6,387,834 B1
(45) Date of Patent: May 14, 2002

(54) SINTERED SILICON CARBIDE BODY AND METHOD FOR PRODUCING THE SAME

(75) Inventors: Fumio Odaka, Niiza; Kazuhiro Ushita, Kodaira; Yoshitomo Takahashi, Fujisawa, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/579,008

(22) Filed: May 26, 2000

(30) Foreign Application Priority Data

Jun. 2, 1999 (JP) .......................................... 11-155225

(51) Int. Cl.$^7$ ...................... C04B 35/569; C04B 35/577
(52) U.S. Cl. ........................... 501/88; 501/90; 264/643; 264/676
(58) Field of Search ..................... 501/88, 90; 264/643, 264/676

(56) References Cited

U.S. PATENT DOCUMENTS

| 4,795,673 A | * | 1/1989 | Frechette et al. | ........... 428/331 |
| 4,859,385 A | * | 8/1989 | Tanaka et al. | ................. 501/88 |
| 5,589,116 A | * | 12/1996 | Kojima et al. | ................. 501/88 |
| 5,618,767 A | * | 4/1997 | Beneker | ........................ 501/90 |
| 6,162,543 A | * | 12/2000 | Dubots et al. | .............. 428/408 |
| 6,248,269 B1 | * | 6/2001 | Dietrich et al. | ............. 264/29.1 |

FOREIGN PATENT DOCUMENTS

| JP | A-61-6110 | 1/1986 |
| JP | A-5-24818 | 2/1993 |
| JP | A-10-67565 | 3/1998 |

* cited by examiner

*Primary Examiner*—Karl Group
(74) *Attorney, Agent, or Firm*—Oliff & Berridge, PLC

(57) ABSTRACT

A method for producing a sintered silicon carbide body which has excellent strength and the like and in which cracking and breaking are prevented is provided. In the method for producing a sintered silicon carbide body, metallic silicon is, in a vacuum atmosphere or in a non-oxidizing atmosphere, impregnated into a molded body containing silicon carbide and carbon so as to form an impregnated body, and the impregnated body is cooled in a state of being provided with a temperature distribution of 0.1–1.5° C./cm.

9 Claims, No Drawings

SINTERED SILICON CARBIDE BODY AND METHOD FOR PRODUCING THE SAME

BACKGROUND OF THE INVENTION

1. Field of the Invention

The present invention relates to a sintered silicon carbide body such as a boat for heat-treating semiconductors or a liner tube, and to a method for efficiently producing the sintered silicon carbide body.

2. Description of the Related Art:

Conventionally, there has been the following problem in the production of a sintered silicon carbide body: when metallic silicon is, in a non-oxidizing atmosphere, impregnated and filled into a molded body containing silicon carbide and carbon so as to form an impregnated body and then the impregnated body is cooled, the impregnated body is broken, because the excess metallic silicon which has not reacted with the carbon volumetrically expands during the cooling and hardening.

Especially in a case of an elongated body, this problem occurs frequently, because the impregnated body hardens in an instant at the same time as the furnace is cooled. It has therefore been difficult to decrease the percentage of defective bodies even if the cooling rate is adjusted.

SUMMARY OF THE INVENTION

It is an object of the present invention to provide a method for producing a sintered silicon carbide body which solves the above-described conventional problem so as to produce a sintered silicon carbide body which does not crack or break, and to provide a sintered silicon carbide body which is produced by the method for producing and has excellent strength and the like.

In the method for producing a sintered silicon carbide body of the present invention for attaining the above object, metallic silicon is, in a vacuum atmosphere or in a non-oxidizing atmosphere, impregnated into a molded body containing silicon carbide and carbon so as to form an impregnated body, and the impregnated body is cooled in a state of being provided with a temperature distribution of 0.1–1.5° C./cm.

In the method for producing a sintered silicon carbide body, first, metallic silicon is impregnated into the molded body. At this time, the molten metallic silicon permeates into the molded body due to capillary action and the like. The permeated metallic silicon reacts with the carbon in the molded body, and silicon carbide is thereby generated. Next, the impregnated body is cooled in a state of being provided with a uniform temperature distribution. Accordingly, unreacted metallic silicon having expanded volume can be gradually formed from the lower temperature side toward the higher temperature side. As a result, a sintered silicon carbide body without cracks or fractures can be obtained.

The sintered silicon carbide body of the present invention for attaining the above object is produced by the method for producing a sintered silicon carbide body of the present invention.

DESCRIPTION OF THE PREFERRED EMBODIMENTS

A method for producing a sintered silicon carbide body of the present invention includes an impregnated body forming step and a cooling step, and includes other steps as needed. The sintered silicon carbide body of the present invention is produced by the method for producing a sintered silicon carbide body of the present invention.

(Impregnated body forming step)

The impregnated body forming step is a step in which metallic silicon is, in a vacuum atmosphere or in a non-oxidizing atmosphere, impregnated into a molded body containing silicon carbide and carbon so as to form an impregnated body.

Molded Body

The molded body is obtained by mixing silicon carbide powder with an organic substance containing one or more types of carbon sources or with carbon powder so as to form mixed powder in a slurry-state, and then by molding the mixed powder. The obtained molded body may be referred to as a green body. This body is a molded body of non-sintered silicon carbide and carbon, which is obtained by removing the solvent from the mixed powder in a slurry-state, and has many pores therein.

The silicon carbide powder can be produced by the latter method using, as a raw material, a silicon carbide powder such as a powder of α-type silicon carbide, β-type silicon carbide, amorphous silicon carbide, or a silicon carbide which is a mixture of these types.

In order to obtain a sintered silicon carbide body with high purity, it is preferable to use high purity silicon carbide powder as a raw material. The grade of the powder of β-type silicon carbide is not particularly limited, and, for example, a commercially available β-type silicon carbide powder can be used.

From the standpoint of obtaining a high density, it is preferable that the silicon carbide powder has a small particle diameter. Specifically, the particle diameter is preferably 0.01–10 $\mu$m, and more preferably 0.05–5 $\mu$m.

When the particle diameter is less than 0.01 $\mu$m, handling in the processes of measuring, mixing and the like may become difficult. On the other hand, when the particle diameter exceeds 10 $\mu$m, the specific surface area of the powder becomes small, i.e., the contact surface area between the particles becomes small, and it may become difficult to obtain a high density.

The high purity silicon carbide powder can be obtained, for example, by dissolving a silicon source including one or more types of silicon compound, a carbon source including one or more types of organic compound which generate carbon by heating, and a polymerization/crosslinking catalyst, in a solvent, and by drying the obtained solution, and then by burning the obtained powder in a nonoxidizing atmosphere.

A combination of a liquid silicon source and a solid silicon source can be used as the silicon source. The silicon source must include at least one type of liquid silicon source.

Examples of the liquid silicon source include (mono-, di-, tri-, tetra-) alkoxysilanes, polymers of tetraalkoxysilane, and the like.

Among the alkoxysilanes, tetraalkoxysilane is preferable, specifically, methoxysilane, ethoxysilane, propoxysilane, butoxysilane and the like are preferable. In terms of handling, ethoxysilane is especially preferable.

Examples of polymers of tetraalkoxysilane include polymers with a low polymerization degree of about 2–15 (oligomers), liquid polymers of silicic acid with a high polymerization degree, and the like. If desired, these polymers may be used in combination with silicon oxide.

Examples of the silicon oxide include, in addition to SiO, silica sol (such as a solution including extremely fine colloidal silica, which includes an OH group and an alkoxyl group therein), silicon dioxide (such as silica gel, fine silica, and quartz powder) and the like.

A single type or a combination of two or more types of the above silicon sources may be used.

Among the silicon sources, in terms of better uniformity and handling, an oligomer of tetraethoxysilane, a mixture of an oligomer of tetraethoxysilane and fine powder of silica, and the like are preferable. Further, silicon sources with high purity are preferable, and specifically, the initial impurities content thereof is preferably 20 ppm or less and more preferably 5 ppm or less.

In addition to a liquid carbon source, a combination of a liquid carbon source and a solid carbon source can be used as the carbon source, and an organic compound which has a high residual carbon ratio and is polymerized or crosslinked by the action of the catalyst or by heating is preferable. Specific examples of the organic compound preferably include monomers, prepolymers and the like of resins such as phenol resin, furan resin, polyimide, polyurethane and polyvinyl alcohol, as well as liquid carbon sources such as cellulose, sucrose, pitch and tar. Among these organic compounds, phenol resin of the resol type is especially preferable. A single type or a combination of two or more types of these carbon sources may be used. Further, the purity thereof can be suitably controlled and selected depending upon the purpose. When a silicon carbide powder with particularly high purity is required, it is preferable that an organic compound which does not include 5 ppm or more of any metal is used.

The polymerization/crosslinking catalyst can be suitably selected in accordance with the carbon source. For example, when the carbon source is phenol resin or furan resin, the polymerization/crosslinking catalyst includes acids such as toluenesulfonic acid, toluenecarboxylic acid, acetic acid, oxalic acid and sulfuric acid. Among these acids, toluenesulfonic acid is more preferable.

When the high purity silicon carbide powder is produced, the content ratio of carbon to silicon (hereinafter, abbreviated as C/Si ratio) cannot be defined absolutely, because the ratio varies depending upon the pressure of the atmosphere. However, the ratio is defined by subjecting an intermediate body of the carbide, which is obtained by carbonizing the mixture of the respective components at 1,000° C., to elemental analysis. From stoichiometry, when the C/Si ratio is 3.0, the free carbon content of the formed silicon carbide should be 0%. However, in practice, free carbon is generated at a lower C/Si ratio, because SiO gas generated simultaneously is volatilized. It is important that the mixing quantity is determined in advance so that the quantity of the free carbon in the formed silicon carbide powder is not an unsuitable quantity for the application of producing a sintered body or the like. Generally, in the burning at 1,600° C. or higher at about 1 atm, in terms of suppression of the quantity of the free carbon, the C/Si ratio is preferably 2.0–2.5.

However, when the C/Si ratio exceeds 2.5, on the one hand, the quantity of generated free carbon remarkably increases, but on the other hand, the free carbon has an effect of suppressing the growth of particles. Accordingly, depending upon the purpose of forming particles, a C/Si ratio exceeding 2.5 may also be preferable.

If desired, the silicon carbide powder may be produced after curing the mixture including the silicon source and the carbon source.

Examples of the curing method include a crosslinking method by heating, a curing method using a curing catalyst, a method using electron beams or radiation, and the like.

The catalyst used in the curing can be suitably selected in accordance with the carbon source. When the carbon source is phenol resin or furan resin, examples of preferred catalysts include acids such as toluenesulfonic acid, toluenecarboxylic acid, acetic acid, oxalic acid, hydrochloric acid, sulfuric acid and maleic acid, and amines such as hexamine, and the like.

The catalyst is dissolved or dispersed in a solvent so as to be mixed. Examples of the solvent include lower alcohols (such as ethyl alcohol), ethyl ether, acetone and the like.

The solvent in which the silicon source, the carbon source and the polymerization/crosslinking catalyst are dissolved is not particularly limited, and examples of the solvent include known organic solvents such as lower alcohol and acetone. A single type or a combination of two or more types of these solvents may be used.

The drying method is not particularly limited, and known drying methods such as hot-air drying, vacuum drying and high-frequency drying are preferably used.

The burning is conducted by carbonizing the obtained powder by heating in a non-oxidizing atmosphere such as an atmosphere of nitrogen or argon at 800–1,000° C. for 30–120 minutes so as to obtain a carbide, and then by heating the obtained carbide in a non-oxidizing atmosphere such as an atmosphere of argon at 1,350–2,000° C. The burning temperature and burning time can be suitably selected in accordance with the desired particle diameter or the like of the silicon carbide. In terms of effective formation, burning at 1,600–1,900° C. is preferable.

Further, by conducting a heat treatment at 2,000–2,100° C. for 5–20 minutes during the burning, a silicon carbide with higher purity can be obtained.

As a method for obtaining a silicon carbide powder with particularly high purity, the method for producing raw-material powder described as a method for producing single crystals in Japanese Patent Application Laid-Open (JP-A) No. 9-48605, which was filed by the applicant of the present application, is preferable. This method includes two processes: a silicon carbide forming process and an after-treatment process. In the silicon carbide forming process, a silicon source which includes one or more types of silicon compound selected from high purity tetraalkoxysilane and a polymer of high purity tetraalkoxysilane is mixed uniformly with a carbon source which is a high purity organic compound which generates carbon by heating, and then the obtained mixture is burned by heating in a non-oxidizing atmosphere so as to obtain a silicon carbide powder. In the after-treatment process, the obtained silicon carbide powder is maintained at a temperature of 1,700° C. or higher and lower than 2,000° C., and during this time, a heat treatment at 2,000–2,100° C. for 5–20 minutes is conducted at least once.

In accordance with this method, a high purity silicon carbide powder in which the impurity element content is 0.5 ppm or less can be obtained. However, the particle size of the high purity silicon carbide powder obtained in this method is not uniform, and thus, it is preferable that the silicon carbide powder is ground and classified so as to have the above-mentioned particle size.

When the silicon carbide powder is produced, if desired, nitrogen can be introduced into the silicon carbide powder for the purpose of providing conductivity. In this case, initially, the silicon source, the carbon source and the polymerization/crosslinking catalyst are mixed uniformly with an organic substance consisting of a nitrogen source. It is preferable that, when the carbon source such as phenol resin, the organic substance consisting of the nitrogen source such as hexamethylenetetramine, and the polymerization/crosslinking catalyst such as toluenesulfonic acid are dissolved in the solvent such as ethanol, they are sufficiently mixed with the silicon source such as an oligomer of tetraethoxysilane.

The mixed powder in a slurry state is produced by dissolving and dispersing the silicon carbide powder, and the carbon powder or the organic substance containing one or more types of carbon sources, in the solvent.

The organic substance is a substance which generates carbon by heating, and is preferably conductive. Specific examples of the organic substance include coal tar pitch with a high residual carbon ratio, pitch tar, phenol resin, furan resin, epoxy resin, phenoxy resin, and various types of saccharides, for example, monosaccharides such as glucose, oligosaccharides such as sucrose, and polysaccharides such as cellulose and starch. A single type or a combination of two or more types of these organic substances may be used. Further, for the purpose of mixing uniformly with the silicon carbide powder, a substance which is liquid at room temperature, a substance which is soluble in a solvent, and a thermoplastic or thermally fusible substance which is softened or made liquid by heating, are preferable. Among these substances, phenol resin, especially phenol resin of the resol type is more preferable, because a molded body obtained therefrom has high strength.

Examples of the carbon powder include pyrolytic carbon such as carbon black and acetylene black, graphite, activated carbon, and water-dispersable carbon, and the carbon powder is preferably conductive. Among these carbon powders, conductive carbon black is especially preferable.

The solvent may be water. For example, when phenol resin which is an organic compound generating carbon by suitable heating is used, examples of the solvent include lower alcohols such as ethyl alcohol, and ethyl ether, acetone and the like.

It is preferable that the organic substance consisting of the carbon source, the carbon powder and the solvent have a low impurities content, respectively.

Uniformly dispersed pores can be formed in the green body by, when the respective components are dissolved and dispersed in the solvent, sufficiently stirring and mixing them.

In the production of the green body, if desired, an organic binder may be added. Examples of the organic binder include deflocculant, powder adhesive and the like. The deflocculant is preferably a nitrogenous compound in terms of obtaining a better effect of providing conductivity, and for example, ammonia, polyacrylic ammonium salt and the like are preferably used. Preferable examples of the powder adhesive include polyvinyl alcohol, urethane resin (such as water soluble polyurethane) and the like.

Further, in addition to the organic binder, if desired, an antifoaming agent may be added. Examples of the antifoaming agent include silicone antifoaming agent and the like.

The organic substance content of the green body is preferably 10–50% and more preferably 15–40% by the carbon content.

When the content is less than 10%, during impregnation of the metallic silicon which will be described later, the amount of carbon is insufficient so that unreacted Si of 5% or more remains in the pores, and thus the conductivity may be decreased. On the other hand, when the content exceeds 50%, the thixotropy of the slurry is easily increased so that the moldability is decreased, and thus the molding may become practically difficult.

If desired, when nitrogen is introduced, initially, the silicon carbide powder, the organic substance consisting of the carbon source or the carbon powder, and the organic substance consisting of the nitrogen source may be mixed uniformly. However, in the same manner as in the above description, it is preferable that, on the one hand, the carbon powder or the organic substance consisting of the carbon source such as carbon black and phenol resin, and on the other hand, the organic substance consisting of the nitrogen source such as hexamethylenetetramine, are dissolved and dispersed in the solvent such as water and ethyl alcohol, and thereafter, are sufficiently stirred and mixed with the silicon carbide powder.

The stirring and mixing can be conducted by using a known stirring and mixing means such as a mixer or a planetary ball mill. The stirring and mixing is conducted preferably for 10–30 hours, and especially preferably for 16–24 hours.

The method for molding the mixed powder in a slurry-state is not particularly limited, and includes known molding methods. In general, cast-in molding is preferable. In the cast-in molding, a molded body (green body) of a standard size can be obtained by casting the mixed powder in a slurry-state in a mold for cast-in molding, leaving the body therein, removing the body from the mold, and then by drying the body with heated air or natural air at a temperature of 50–60° C. so as to remove the solvent.

In the present invention, in the terms of strength and the like, it is preferable that, before the metallic silicon is impregnated into the molded body including silicon carbide and carbon, the molded body is pre-burned.

The temperature in the pre-burning is preferably 1,200–2,400° C., and more preferably 1,450–2,000° C.

When the temperature is lower than 1,200° C., the contact between the silicon carbide powder bodies in the green body is not sufficiently promoted so that the adhesive strength does not become sufficient, and thus the handling property may not be improved. On the other hand, when the temperature exceeds 2,400° C., the silicon carbide powder bodies in the green body grow considerably, and thus the metallic silicon which will be described later may not be sufficiently impregnated.

The heating rate in the pre-burning is preferably 1–3° C./min in the range to 800° C., and is preferably 5–8° C./min in the range from 800° C. to the highest temperature. However, the heating rate can be suitably determined in consideration of the shape, size and the like of the green body.

The longest time for carrying out pre-burning is preferably 10–120 minutes, and more preferably 20–60 minutes. However, the longest time can be suitably determined in consideration of the shape, size and the like of the green body. Further, in terms of preventing oxidation, it is preferable that the pre-burning is conducted in a vacuum atmosphere or in an inert gas atmosphere.

The pre-burning is conducted by using a known apparatus such as a vacuum sintering furnace, an atmosphere furnace or a roasting furnace.

Metallic Silicon

The metallic silicon is a high purity metallic silicon (a metallic silicon whose impurities content is less than 1 ppm). The metallic silicon is heated at a temperature which is the melting point thereof or higher so as to be melted, and is impregnated into the molded body.

The metallic silicon which has turned into liquid by the impregnation permeates into the molded body due to capillary action and the like, and reacts with the free carbon in the molded body. Then, silicon carbide is generated by this reaction, and the pores and the like in the molded body are filled with the silicon carbide. As a result, the sintered silicon carbide body of the present invention which has high density, strength and excellent conductivity can be obtained.

The temperature for heating and melting the metallic silicon is preferably 1,420–1,700° C., and more preferably 1,550–1,650° C.

When the temperature for heating and melting is lower than 1,420° C., the viscosity of the metallic silicon increases, and thus the metallic silicon may not permeate into the molded body due to capillary action and the like. On the other hand, when the temperature exceeds 1,700° C., the evaporation of the metallic silicon increases, and thus the furnace body and the like may be damaged.

The impregnating time is not particularly limited, and can be suitably determined depending upon the size of the molded body and the quantity of the free carbon in the molded body.

Examples of the shape of the metallic silicon include various types such as powder, granule, mass and the like. Massive metallic silicon having a diameter of 2–5 mm is preferable.

The total impurity element content of the impregnated body is preferably 10 ppm or less, and more preferably 5 ppm or less. However, in terms of application to the semiconductor industrial field, the above impurity element content due to chemical analysis is merely intended as a value for reference. In practice, the evaluation varies depending upon whether the impurities are distributed uniformly or locally. In general, any of various means can be used to evaluate to what extent the impregnated body is contaminated by impurity elements when a general purpose apparatus is used under a predetermined heating condition.

(Cooling step)

The cooling step is a step in which the impregnated body is cooled in a state of being provided with a temperature distribution of 0.1–1.5° C./cm.

Due to the cooling and hardening of the impregnated body in a state of being provided with this temperature distribution, unreacted metallic silicon having expanded volume can be gradually formed from the lower temperature side toward the higher temperature side. As a result, a sintered silicon carbide body without cracks or fractures can be obtained.

When the temperature distribution is less than 0.1° C./cm, the expanded volume of the metallic silicon during the cooling and hardening is not sufficiently absorbed. On the other hand, when the temperature distribution exceeds 1.5° C./cm, the temperature distribution is large and the expansion difference causes cracks. This is the reason why the impregnated body is cooled in a state of being provided with a temperature distribution of 0.1–1.5° C./cm in the cooling step.

In the present invention, in terms of less internal distortion, it is more preferable that the impregnated body is cooled in a state of being provided with a temperature distribution of 0.5–1.0° C./cm. The direction in which a temperature distribution is provided for the impregnated body is not particularly limited, and the direction can be suitably selected depending upon the purpose. For example, if the impregnated body is a bar, the direction is preferably the longitudinal direction thereof, and if the impregnated body does not have the longitudinal direction, the direction may be an arbitrary direction.

Methods for providing a temperature distribution for the impregnated body are not particularly limited, and include, for example, a method for providing a temperature distribution at the impregnated body in which two or more heaters are provided in a heating furnace, and the heating temperatures of the heaters are decreased gradually from one end of the heating furnace to the other end thereof so as to provide a constant temperature gradient.

As long as a uniform temperature distribution is provided at the impregnated body, methods for cooling the impregnated body are not particularly limited, and include, for example, a cooling method in which the impregnated body is moved parallel at constant speed from the higher temperature side to the lower temperature side in the heating furnace having the above-mentioned constant temperature gradient. Another example of the method for cooling the impregnated body is a cooling method in which the impregnated body is not moved parallel but is fixed in a heating furnace having a constant temperature gradient, and the heating temperatures of the two or more heaters are decreased at the same speed, and the impregnated body is thereby cooled in the state in which a constant temperature gradient is maintained.

The cooling rate of the impregnated body is preferably 50° C./h or less, and more preferably 5–20° C./h. When the cooling rate exceeds 50° C./h, internal distortion and thereby cracks may be caused.

In the case in which the impregnated body is moved from the higher temperature side to the lower temperature side in the heating furnace so as to be cooled, the moving rate of the impregnated body can be suitably selected so that the impregnated body has a preferable cooling rate. In a state in which the impregnated body is provided with a predetermined temperature distribution, cooling of the impregnated body may be carried out at least until the temperature at the higher temperature side of the impregnated body reaches 1400° C. At temperatures of 1400° C. or less, because the molten metallic silicon has completely hardened, cooling may be carried out without providing a temperature distribution.

As long as the above-mentioned heating conditions of the present invention can be satisfied, the production apparatuses used in the method for producing a sintered silicon carbide body of the present invention are not particularly limited, and known heating furnaces, reactors and the like may be used.

The method for producing a sintered silicon carbide body of the present invention prevents the sintered silicon carbide body from cracking or breaking during the cooling and hardening, and has excellent production efficiency. Further, the obtained sintered silicon carbide body has high density, excellent strength and the like.

In accordance with the method for producing a sintered silicon carbide body of the present invention, the total impurity element content of the obtained sintered silicon carbide body can be 10 ppm or less.

The term "impurity element" used herein means the elements which belong to groups 1–16 in the periodic table of revised version of IUPAC inorganic chemistry nomenclature in 1989 and have an atomic number of 3 or more except for the numbers of 6–8 and 14.

Further, in accordance with the method for producing a sintered silicon carbide body, the obtained sintered silicon carbide body tends to have high density of 2.9 g/cm$^3$ or more, and to become a polycrystalline semiconductor which exhibits conductivity. Namely, conductive electrons contributing to the electrical conductivity flow between the silicon carbide crystals across the grain boundary, and thus, the junction of the grain boundary phase and the silicon carbide is also important for exhibition of conductivity.

Moreover, the sintered silicon carbide body obtained in accordance with the method for producing a sintered silicon carbide body of the present invention has high bending strength. The bending strength of a general sintered silicon carbide body is 240 MPa or more at room temperature, and is 55.0–80.0 MPa at 1,500° C. However, the bending strength of the sintered silicon carbide body obtained in accordance with the method for producing a sintered silicon carbide body of the present invention is 350 MPa or more at room temperature.

EXAMPLES

Although Examples of the present invention will be described hereinafter, the present invention is not limited to these Examples.

Example 1

3,400 g of high purity silicon carbide powder having a centriole diameter of 0.8 $\mu$m (silicon carbide including 1.5% by weight of silica and having an impurities content of 5 ppm or less, which is produced in accordance with the producing method described in (JP-A No. 9-48605) as silicon carbide powder, 600 g of carbon black (#SL200 manufactured by Nippon Steel Chemical Co., Ltd.) as carbon powder, and 44 g of polyacrylic ammonium as a deflocculant were added to 2,200 g of dissolved water, and were dispersed and mixed in a ball mill for 16 hours. Then, 120 g of water soluble polyurethane (U-COAT manufactured by Sanyo Chemical Industries, Ltd.) as a powder adhesive and 4 g of silicone antifoaming agent (KM72A manufactured by Shin-Etsu Chemical Co., Ltd.) were added to the obtained mixture, and were dispersed and mixed in the ball mill for another 10 minutes, so as to produce a mixed powder in a slurry-state and having a viscosity of 1.8 Pa·S.

The obtained mixed powder in a slurry-state was cast in plaster molds of 800×$\phi$20 and of $\phi$200×15t, left for 6 hours, removed from the molds, and dried (at 50° C.) for 12 hours so as to prepare molded bodies (green bodies) including free carbon. As a result, four cylindrical molded bodies of 800×$\phi$20 and two tabular molded bodies of $\phi$200×15t were prepared.

The obtained molded bodies (green bodies) were pre-burned at 1,800° C. for 1 hour (heating rate: 1° C./min up to 800° C. and 5° C./min up to 1,800° C.; atmosphere: vacuum) and maintained for 10 minutes so as to obtain pre-burned molded bodies. The pre-burned two tabular bodies were connected to the end portions of the pre-burned four cylindrical bodies so as to prepare a molded body in a wafer board shape.

The obtained molded body in a wafer board shape was immersed into a 2–5 mm mass of high purity metallic silicon heated up to 1,550° C. and melted in an atmosphere of argon (which is manufactured by Kojundo Chemical Laboratory Co., Ltd.) in a carbon crucible with an internal diameter of 60 mm and a height of 80 mm, and was maintained for 30 minutes. The free carbon in the molded body was thereby reacted with the melted metallic silicon permeated into the molded body due to capillary action so as to prepare an impregnated body.

The obtained impregnated body was cooled at a rate of 50° C./h in a state of being provided with a temperature distribution of 1.5° C./cm in the longitudinal direction of the impregnated body.

As a method for providing the impregnated body with a temperature distribution, a method was used in which three heaters were disposed in the longitudinal direction of the atmosphere furnace (the longitudinal direction of the impregnated body) and controlled so as to provide the above temperature distribution. Each of the three heaters was provided with a temperature controller, and a main temperature controller generally controlling these temperature controllers was connected to the three temperature controllers.

As a method for cooling the impregnated body, a method was used in which the three temperature controllers were controlled by the main temperature controller and the heating temperatures of the three heaters were decreased at the same rate of 50° C./h.

Example 2

A sintered silicon carbide body was prepared in the same manner as in Example 1, except that the impregnated body was cooled at a rate of 20° C./h in a state of being provided with a temperature distribution of 1.0° C./cm in the longitudinal direction of the impregnated body.

Example 3

A sintered silicon carbide body was prepared in the same manner as in Example 1, except that the impregnated body was cooled at a rate of 5° C./h in a state of being provided with a temperature distribution of 0.25° C./cm in the longitudinal direction of the impregnated body.

In Examples 1–3, cracking and breaking were prevented, and excellent production efficiency was exhibited. Further, each of the obtained sintered silicon carbide bodies had high density, excellent strength and the like.

Comparative Example 1

A sintered silicon carbide body was prepared in the same manner as in Example 1, except that the impregnated body was cooled in a state in which it was not provided with a temperature distribution in the longitudinal direction of the impregnated body.

In this Comparative Example 1, two of the four cylindrical sintered bodies of 800×$\phi$20 were broken at vicinities of the centers thereof.

In accordance with the present invention, a method for producing a sintered silicon carbide body which prevents cracking and breaking, and a sintered silicon carbide body which is produced in the producing method so as to have excellent strength and the like, can be provided.

What is claimed is:

1. A method for producing a sintered silicon carbide body, comprising impregnating metallic silicon into a molded body containing silicon carbide and carbon in a vacuum atmosphere or in a non-oxidizing atmosphere, to form an impregnated body, and cooling the impregnated body in a state of being provided with a temperature distribution of 0.1–1.5° C./cm.

2. A method for producing a sintered silicon carbide body according to claim 1, wherein said impregnated body is cooled in a state of being provided with a temperature distribution of 0.5–1.0° C./cm.

3. A method for producing a sintered silicon carbide body according to claim 1, wherein said molded body is pre-burned at 1,200–2,400° C. before the metallic silicon is impregnated into said molded body.

4. A method for producing a sintered silicon carbide body according to claim 1, wherein said molded body is pre-burned at 1,450–2,000° C. before the metallic silicon is impregnated into said molded body.

5. A method for producing a sintered silicon carbide body according to claim 1, wherein said metallic silicon is heated at 1,420–1,700° C. so as to be melted for the impregnating into said molded body.

6. A method for producing a sintered silicon carbide body according to claim 1, wherein said metallic silicon is heated at 1,550–1,650° C. so as to be melted for the impregnating into said molded body.

7. A method for producing a sintered silicon carbide body according to claim 1, wherein the cooling of said impregnated body by being provided with said temperature distribution comprises decreasing heating temperature of two or more heaters at a same rate.

8. A method for producing a sintered silicon carbide body according to claim 1, wherein the cooling rate of said impregnated body is 50° C./h or less.

9. A method for producing a sintered silicon carbide body according to claim 1, wherein the cooling rate of said impregnated body is 5–20° C./h.

* * * * *